US010095266B2

(12) United States Patent
Inomata

(10) Patent No.: US 10,095,266 B2
(45) Date of Patent: Oct. 9, 2018

(54) SYSTEM AND METHOD FOR INTERFACING BETWEEN A DISPLAY AND A CONTROLLER

(71) Applicant: COLOPL, Inc., Tokyo (JP)

(72) Inventor: Atsushi Inomata, Kanagawa (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/373,767

(22) Filed: Dec. 9, 2016

(65) Prior Publication Data
US 2017/0221269 A1 Aug. 3, 2017

Related U.S. Application Data

(60) Provisional application No. 62/288,388, filed on Jan. 28, 2016.

(51) Int. Cl.
G09G 5/00 (2006.01)
G06F 1/16 (2006.01)
G06F 3/16 (2006.01)
G06F 3/0346 (2013.01)
(Continued)

(52) U.S. Cl.
CPC ............ *G06F 1/163* (2013.01); *G06F 1/1694* (2013.01); *G06F 1/1698* (2013.01); *G06F 3/011* (2013.01); *G06F 3/017* (2013.01); *G06F 3/0346* (2013.01); *G06F 3/04883* (2013.01); *G06F 3/167* (2013.01)

(58) Field of Classification Search
CPC ...... G06F 1/1694; G06F 1/1698; G06F 3/011; G06F 3/017; G06F 3/04883; G06F 3/167; G06F 3/0346; G06F 1/163
See application file for complete search history.

(56) References Cited

U.S. PATENT DOCUMENTS 6,215,498 B1* 4/2001 Filo .................. G06F 3/011
345/419
2011/0164163 A1* 7/2011 Bilbrey .............. G06F 1/1694
348/333.01
(Continued)

FOREIGN PATENT DOCUMENTS

JP 2013-125247 A 6/2013
JP 2013-134532 A 7/2013
(Continued)

OTHER PUBLICATIONS

Kim et al., Using Keyboards with Head Mounted Displays, Association for Computing Machinery, 336-343.*
(Continued)

*Primary Examiner* — Robert Craddock
(74) *Attorney, Agent, or Firm* — Hauptman Ham, LLP

(57) ABSTRACT

A system includes a first device configured to cause a virtual reality image to be output by a display. The system also includes a second device communicatively coupled with the first device. The second device is configured to detect a user input associated with an action capable of being displayed in the virtual reality image. The second device is also configured to cause the first device to cause an object to be displayed in the virtual reality image based on the user input. The object at least partially includes a graphic representative of one or more of the second device, a user movement with respect to the second device, or the user input.

18 Claims, 14 Drawing Sheets

(51) Int. Cl.
*G06F 3/01* (2006.01)
*G06F 3/0488* (2013.01)

(56) References Cited

U.S. PATENT DOCUMENTS

| | | | |
|---|---|---|---|
| 2012/0210254 A1* | 8/2012 | Fukuchi | G06F 3/012 |
| | | | 715/757 |
| 2012/0249741 A1* | 10/2012 | MacIocci | G06F 3/011 |
| | | | 348/46 |
| 2013/0249947 A1* | 9/2013 | Reitan | G06F 3/011 |
| | | | 345/633 |
| 2013/0257690 A1 | 10/2013 | Fujimaki | |
| 2014/0132536 A1 | 5/2014 | Ikenaga et al. | |
| 2014/0320383 A1 | 10/2014 | Goto et al. | |
| 2015/0002434 A1 | 1/2015 | Tsukahara et al. | |
| 2015/0243082 A1 | 8/2015 | Ueno et al. | |

FOREIGN PATENT DOCUMENTS

| | | | |
|---|---|---|---|
| JP | 2013-205920 A | 10/2013 | |
| JP | 2014-68689 A | 4/2014 | |
| JP | 2014-96074 A | 5/2014 | |

OTHER PUBLICATIONS

Office Action in JP Application No. 2014-214266, dated Jan. 25, 2016.
Office Action in JP Application No. 2014-214266, dated Jun. 28, 2016.
Decision to Grant a Patent in JP Patent Application No. 2014-214266, dated Jul. 26, 2016.

* cited by examiner

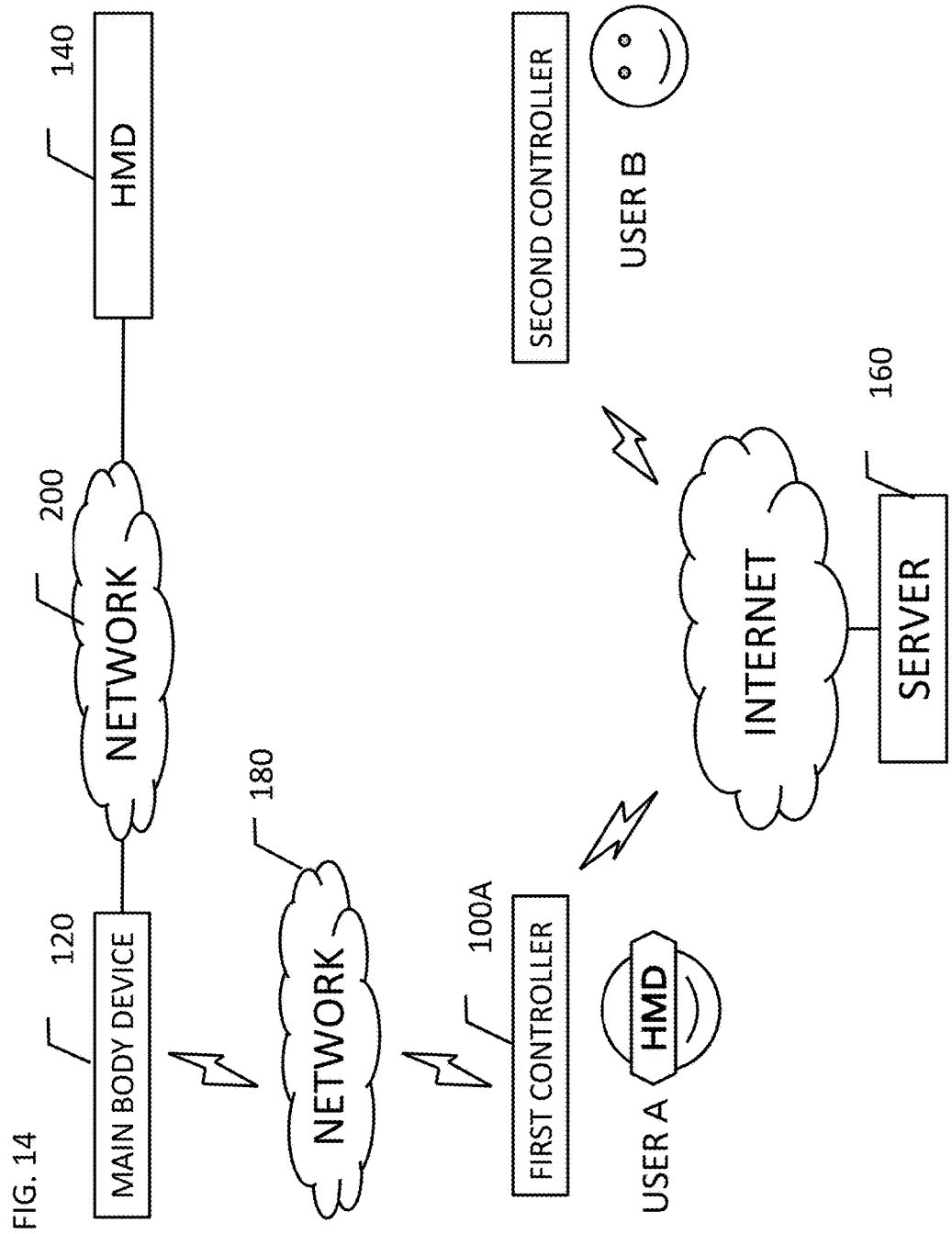

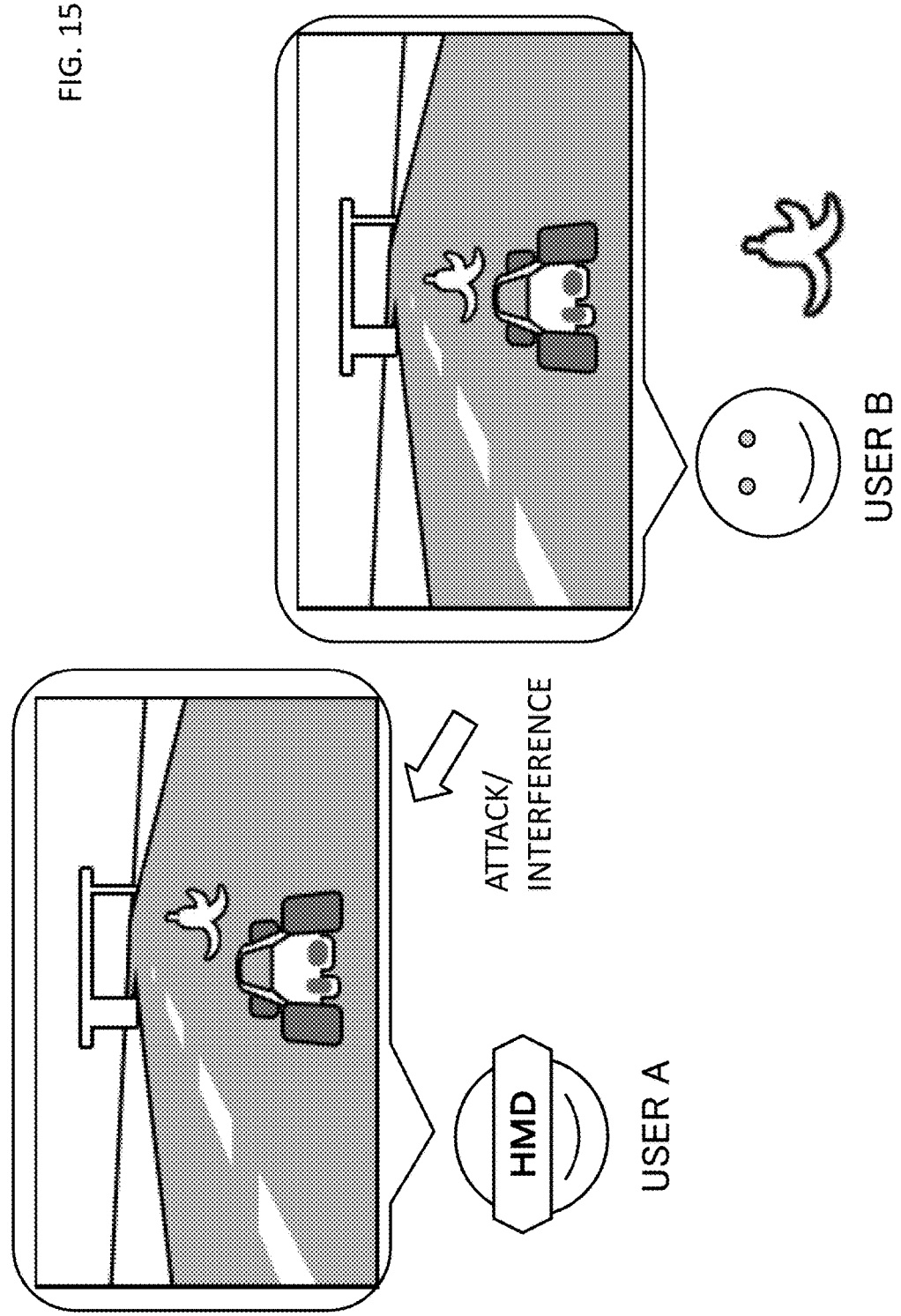

SYSTEM AND METHOD FOR INTERFACING BETWEEN A DISPLAY AND A CONTROLLER

RELATED APPLICATIONS

The present application claims priority to U.S. Provisional Application No. 62/288,388, filed Jan. 28, 2016, the disclosure of which is hereby incorporated by reference herein in its entirety.

BACKGROUND

Users sometimes interact with software by way of a controller configured to receive a user input. The controller is often a tactile device that is held or touched by a user. Users sometimes view an image associated with the software via a display. Users usually provide a user input to the controller while viewing the display. Device manufacturers and service providers are continually challenged to enhance a user's interaction with a virtual reality image output by a display.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 14 is a block diagram of a system comprising a plurality of controllers, in accordance with some embodiments.

FIG. 15 is an user interface in which one virtual reality image is accessed by a plurality of users by way of a plurality of controllers, in accordance with some embodiments.

DETAILED DESCRIPTION

Figure 1:
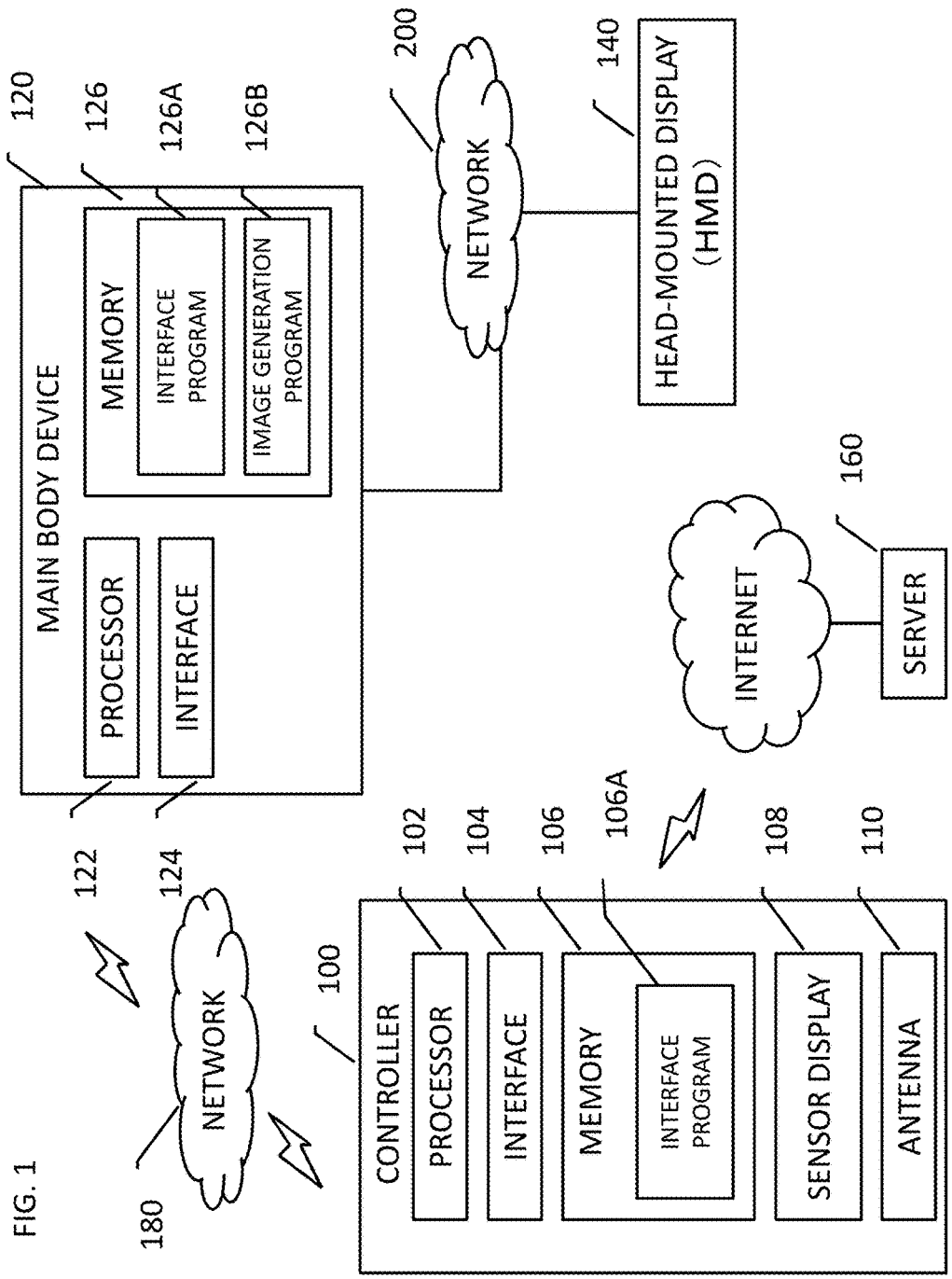
FIG. 1 is a block diagram of a system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

A head-mounted display (HMD) is a display that is wearable on a user's head. An HMD is capable of presenting images to the user with a display or the like arranged right in front of the user's eyes. Some HMD's are connected to an external network, e.g., the Internet, via a main body device. Conventional controllers by which a user is able to interact with software that is associated with an image presented by way of the HMD do not communicate to or from the external network. Additionally, conventional controllers are often a dedicated controller for connection to a HMD. Sometimes, when a dedicated controller is necessary for operation of the HMD, the user is required to carry the dedicated controller for every HMD operation.

Some conventional controllers that are usable to interact with software that is associated with an image presented by way of the HMD often include buttons, keys or motion sensors to facilitate performance of one or more operations or interactions. Such controllers however, do not include a sensor display, which makes performance of some intuitive and finer operations difficult.

For example, if a controller is configured to cause one or more operations to occur via software associated with an image presented by way of the HMD based on a user's actuation of a button or key, and a user is completely immersed in a virtual space while wearing the HMD, the user often has difficulty recognizing a current state of the controller that the user is attempting to operate. For example, a user may have difficulty understanding which key or button the user's finger is placed. As such, when the user's finger is displaced from a desired key or button, the user may perform an undesired operation.

One operation screen is sometimes shared and operated by a plurality of users located in a same space, and a plurality of controllers are connected to one main body device. A multi-controller configuration often increases demand for system resources and causes a high load to be placed on the main body device. Additionally, when one operation screen is shared and operated by a plurality of users located in different spaces, the plurality of controllers are connected to different main body devices in the respective spaces. Thus, communication is made by connecting each of the main body devices to a server via a network. In this situation, different main body devices are necessary for the plurality of controllers to facilitate user interaction with the software associated with the image presented by way of the HMD.

FIG. 1 is a block diagram of a system in accordance with some embodiments.

The system includes a controller 100 and a main body device 120 connected to the controller 100 by way of a network 180. In some embodiments, the network 180 is wired network. In some embodiments, the network 180 is a wireless network. In some embodiments, network 180 comprises a combination of wireless and wired network connections. The system also includes a head-mounted display 140 connected to the main body device 120 by way of a network 200. In some embodiments, network 200 is a wired network. In some embodiments, network 200 is a wireless network. In some embodiments, network 200 comprises a combination of wired and wireless network connections.

By way of example, one or more of network 180 or network 200 include one or more networks such as a wired data network, a wireless network, a telephony network, or a combination thereof. In some embodiments, one or more of network 180 or network 200 comprises any local area network (LAN), metropolitan area network (MAN), wide area network (WAN), a public data network (e.g., the Internet), short range wireless network, a packet-switched network, such as a commercially owned, proprietary packet-switched network, e.g., a proprietary cable or fiber-optic network, or any other suitable packet-switched network, some other suitable data network, or any combination thereof. In some embodiments, a wireless network comprises a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), other suitable communication network or system, or any combination thereof.

The controller 100 includes an antenna 110, and is thus capable of connecting to a network, e.g., the Internet, to communicate to/from a server 160 without the main body device 120. The server 160 comprises a processor, one or more data storage devices, and a data communication device, and is configured to transmit or receive data to or from the controller 100. In some embodiments, the server 160 is configured to manage communications between a plurality of controllers 100.

The controller 100 includes at least one processor 102, at least one interface 104, at least one memory 106, at least one sensor display 108, and the antenna 110. In some embodiments, controller 100 is a computing device or system that is any type of mobile terminal, fixed terminal, or portable terminal including a mobile handset, station, unit, device, multimedia computer, multimedia tablet, Internet node, network node, satellite, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. In some embodiments, the control 100 is or can support any type of interface to the user (such as "wearable" circuitry, etc.). For ease of discussion, the controller 100 is generally referred to as a mobile device that is held or worn by a user. In some embodiments, the controller 100 is configured to detect one or more types of operation input based on the user's operation, user motion input based on the user's motion, voice input, or other suitable input for interacting with software associated with the image presented by way of the HMD.

The controller-side processor 102 is configured to perform various types of processing such as execution of a controller-side interface program 106A and instruction of commands to respective functional units. The controller-side interface program 106A is usable to achieve functions of a transmission unit and a reception unit (FIG. 2) of the user controller to be described later.

The controller-side interface program 106A is usable to achieve a function of a transmission unit 204 to be described later, to thereby transmit output data from the controller 100 to the main body device 120 via the network 180. Further, the controller-side interface program 106A is used to achieve a function of a reception unit 206 to be described later, to thereby receive, from the main body device 120 to the controller 100, various types of data including experience information, e.g., an image that the user experiences in a virtual space.

The controller-side interface 104 is an interface configured to transmit output data to the main body device 120 via the network 180 and to receive data from the main body device 120. The controller-side interface 104 is achieved by implementing the controller-side interface program 106A. In more detail, the controller-side interface 104 is an interface configured to transmit, to the main body device, data obtained from various sensors built into the controller, or output data, e.g., an image stored in the memory of the controller, and/or to receive, from the main body device, experience information such as an image or a moving image that the user experiences in a virtual space when the user wears a head-mounted device and is immersed in the virtual space.

The controller-side memory 106 stores the controller-side interface program 106A. Further, the controller-side memory 106 can store various types of data such as images and moving images taken by the user in the past and note information stored in the past, and data obtained from various sensors, which is generated based on operations and motions performed by the user.

The sensor display 108 is a touch sensor configured to detect one or more of a swipe operation, a pinch-in/pinch-out operation, a tap operation, or some other suitable contact-based operation performed by the user. The sensor display 108 enables a user to perform intuitive and fine operations through the swipe or pinch-in/pinch-out operation, for example. The sensor display 108 makes it possible for a user to perform an intuitive operation by way of the swipe operation, the tap operation, the pinch operation, or some other suitable contact-based input without confirming the positions of the keys and buttons.

The controller 100 includes the antenna 110, and the controller 100 is itself configured to communicate to/from an external network, e.g., the Internet. In some embodiments, the controller 100 is configured to acquire in real time various types of information that can be acquired via the external network, such as weather information, map information, and applications, without applying a load to the main body device during execution of the application, to thereby reflect the acquired information to an application executed by the main body device or a display screen of the HMD. In some embodiments, the controller is configured to download the controller-side interface program 106A from the server 160 to the user controller 100 via the network, e.g., the Internet, by the antenna 110, to thereby install the controller-side interface program 106A to the user controller. When the user installs the controller-side interface program 106A to the controller 100, the controller 100 can be connected to the main body device 120 with use of an arbitrary controller, e.g., a smart phone, without using a controller dedicated to a head-mounted device. In this manner, the output data from the controller 100 can be reflected to the display of the head-mounted device 140.

In some embodiments, the controller 100 includes one or more of a microphone configured to detect a voice input from the user, an accelerometer a gyroscope configured to detect a motion input performed by the user, buttons, keys, a camera, a GPS unit, or a vibration device (not shown).

The microphone is configured to detect the voice or the like of the user holding or wearing the controller 100. Including the microphone enables reflection of the words spoken by the user to a display object to be displayed on the HMD 140. Further, with use of a voice recognition application stored in the memory, the words spoken by the user can be audibly recognized so that, for example, on a game application executed by the main body device 120, the display object can perform motions, e.g., opening a door when the user speaks the magic words.

The accelerometer and the gyroscope are configured to detect motions of the user holding or wearing the controller 100, e.g., a user's motion of swinging around the controller or throwing an object. Further, the accelerometer is configured to detect the number of steps taken by the user. Further, including the accelerometer, the gyroscope, and the sensor display 108 enables instantaneous conversion of a motion of the display object (jumping of the display object), which corresponds to one operation input to the controller 100 (for example, tap operation), into another motion of the display object (sliding of the display object) with easy switching operations, e.g., shaking the terminal. In particular, the tap operation is an easy operation for the user wearing the HMD, and hence various motions of the display object, such as shooting, cutting with a sword, and jumping, are allocated to the tap operation on the application. When the user is immersed in the virtual space while wearing the HMD, the user cannot directly visually refer to the controller 100 being operated. With use of the accelerometer and the gyroscope, the user can instantaneously convert the motion of the display object reliably with easy and intuitive operations, e.g., shaking the terminal.

The buttons and the keys receive the operation input performed by the user holding or wearing the controller 100.

The camera is configured to take pictures and moving images. In some embodiments, the taken pictures and moving images are stored into the memory of the controller 100. in some embodiments, images and moving images captured by the camera and/or stored in the memory of the controller 100 can be reflected to the virtual space displayed on the head-mounted display.

The GPS unit is configured to detect a position of the user holding or wearing the controller 100. Therefore, for example, a display screen of the HMD 140 can be generated based on the detected position of the user. For example, when the user is located in Hokkaido, a character of the display object to be operated by the user in the virtual space displayed on the HMD can be set to a Hokkaido-specific character.

The vibration device is configured to vibrate the controller 100 in association with a game when, for example, the user wearing the HMD 140 and playing a game is attacked in the virtual space displayed on the HMD 140. The information experienced by the user during execution of the application in the virtual space is transmitted by a main body device-side interface program 126A to the interface program 106A via the network 180. Then, the vibration device vibrates the controller 100 based on the information experienced by the user, which is received by the controller-side interface program 106A. Vibration of the controller 100 enables further immersion of the user into the virtual space.

The main body device 120 is configured to transmit or receive data to or from each of the user controller 100 and the head-mounted display 140. In some embodiments, the main body device 120 includes at least one processor 122, at least one interface 124, and at least one memory 126.

The main body device-side processor 122 is configured to perform various types of processing such as instruction of commands to respective functional units, execution of various applications, e.g., a game, execution of the main body device-side interface program 126A, execution of an image generation program 126B for performing processing of generating and outputting an image, and sound generation processing.

The main body device-side interface 124 is an input/output interface configured to receive output data transmitted from the controller 100 via the network, transmit predetermined data from the main body device 120 via the network, and output, to the HMD 140, a generated image in which the display object is arranged.

The main body device-side memory 126 is configured to store the main body device-side interface program 126A, the image generation program 126B, and programs and data for achieving various functions to be executed by the processor 122 of the main body device 120.

The main body device-side interface program 126A is usable to achieve a function of an input detection unit 304 (FIG. 3) to be described later. The main body device 120 is configured to detect and receive the output data transmitted from the controller 100, and to transmit various types of data from the main body device 120 to the controller 100 by executing the main body device-side interface program 126A. The main body device-side interface program 126A is installed in the main body device 120. For example, the main body device-side interface program 126A can be downloaded to the main body device 120 via a network (not shown), e.g., the Internet or Intranet connected to the main body device 120, or can be installed with use of a recording media. By installing the main body device-side interface program 126A in the main body device 120, and installing the controller-side interface program 106A to be described later in the controller 100, the user can use an arbitrary controller, e.g., a mobile terminal or a smart phone, instead of using a controller dedicated to the HMD, to thereby reflect the user input from the controller 100 or the like to the HMD 140, or transmit, to the controller 100, the display on the HMD 140 and information of the application being operated. Further, the main body device-side interface program 126A makes it possible to acquire and identify output data obtained from each of a plurality of controllers 100, to thereby connect the plurality of controllers 100 to a single main body device 120.

The image generation program 126B is usable to achieve functions of an operation determination unit 302, a motion determination unit 306, a display calculation unit 308, and an image generation/output unit 310 to be described later.

The HMD 140 is connected to the main body device 120, and is configured to display a generated image output from the main body device 120. In some embodiments, the HMD 140 is configured to virtually display the sensor display (reference symbol 602 in FIG. 6), the buttons, and the keys of the controller 100 held or worn by the user.

Figure 2:
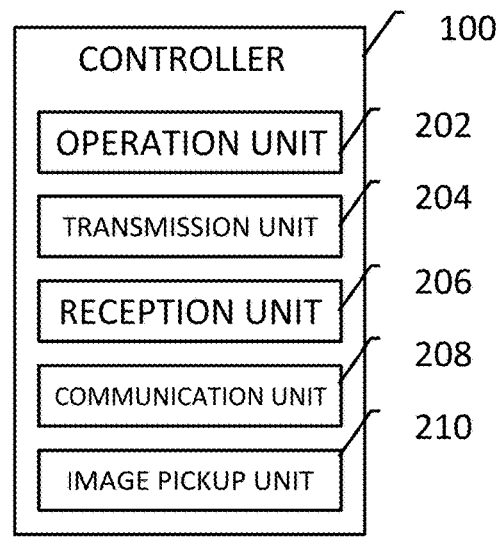
FIG. 2 is a block diagram of a controller, in accordance with some embodiments.

FIG. 2 is a block diagram of the controller 100, in accordance with some embodiments. The controller 100 includes an operation unit 202, a transmission unit 204, a reception unit 206, a communication unit 208, and an image pickup unit 210. The operation unit 202, transmission unit 204, reception unit 206, communication unit 208, and image pickup unit 210, or a part of any function thereof, is achieved by executing a predetermined program stored in the memory 106 of the user controller 100 by the processor 102. The transmission unit 204 and the reception unit 206 of the controller 100 are achieved by executing the controller-side interface program 106A by the controller-side processor 102. The interface program 106A is downloaded from the server 160 via the Internet with use of the antenna 130 of the controller 100, and is thus installed in the controller 100.

The operation unit 202 is configured to acquire, from one or more sensors included in the controller 100, one or more inputs relating to predetermined motions or operations performed by the user to the controller 100. The one or more sensors included in the controller comprise one or more of a display sensor, an accelerometer, a gyroscope, a microphone sensor, a GPS sensor, or other suitable sensor. In some embodiments, the processor 102 of the controller 100 is configured to combine one or more inputs detected based on the one or more sensors with one or more inputs from other operation units such as buttons and keys (for example, operation input of performing a motion of swinging the controller while pressing the button of the controller). In some embodiments, when the user moves the controller 100, the operation unit 202 is configured to acquire, from the accelerometer and the gyroscope, acceleration and an angular velocity with respect to the motion. In some embodiments, when the user performs a swipe operation, a pinch-in/pinch-out operation, or a tap operation on the sensor display 108 of the controller 100, the operation unit 202 is configured to acquire, from the sensor display 108, the types of the operations and/or various types of data relating to those operations, such as contact to the display (tap), contact time (long press/tap), the number of times of contact within a predetermined time period (successive taps, single press), the displacement amount of continuous contact on the display (swipe distance, pinch distance), the contact displacement direction (swipe direction, pinch direction), and the contact displacement speed (swipe speed, pinch speed). in some embodiments, when the user speaks to the microphone of the controller 100, the operation unit 202 is configured to acquire the user voice input from the microphone. In some embodiments, the operation unit 202 is configured to store those pieces of information such as the acceleration or angular velocity, operation input information, voice input information, and/or position information to the memory.

In some embodiments, the acceleration and the angular velocity obtained from the accelerometer and the gyroscope are collectively referred to as "motion input information." Further, the contact to the sensor display, the displacement amount of the continuous contact to the display, the contact displacement direction, and the contact displacement speed, which are obtained from the sensor display when the user performs the swipe operation, the tap operation, or the pinch operation on the sensor display, are collectively referred to as "operation input information."

The transmission unit 204 is configured to transmit, as output data, those pieces of information stored in the memory to the input detection unit 304 via the network 180 in response to a request from the main body device 120. The output data corresponds to the motion input information, the operation input information, the voice input information, and the position information, which are output from the operation unit 202 and relate to the predetermined motions and operations performed to the controller 100, and images and moving images stored in the memory 106 of the controller 100, or combinations thereof.

The reception unit 206 is configured to receive information transmitted from the main body device 120. If the user is immersed in the virtual space while wearing the HMD 140, the reception unit 206 is configured to receive information experienced by the user in the virtual space. For example, when the user playing a game is attacked in the virtual space displayed on the HMD 140, the reception unit 206 receives the information of being attacked. Then, the controller-side processor 102 executes a vibration function based on the received information of being attacked, to thereby vibrate the controller 100. In some embodiments, reception unit 206 is configured to receive videos displayed while playing a game from the main body device 120. The controller-side processor 102 is configured to store the received videos to the memory of the controller 100, or display the videos on the controller-side display 108.

The communication unit 208 is configured to download various types of data, e.g., a program, from the server 160, upload videos being operated by the user to the server 160, and directly communicate to/from another controller 100 if there are a plurality of controllers 100. In general, the communication unit 208 performs communication via the Internet. In some embodiments, the communication unit 208 enables the controller 100 to connect to the external server 160 without a connection to the main body device 120. Therefore, the controller 100 can install or update the controller-side interface program 106A in an arbitrary location even without connection to the main body device 120 as long as the controller 100 is in an environment connectable to the Internet. Further, the controller 100 can acquire various types of information that can be acquired from the Internet (weather information, stock price information, and map information), to thereby reflect the information to the screen being operated by the user or the content of the game being operated by the user. In some embodiments, if there are a plurality of controllers 100, the controller 100 is configured to communicate to/from another controller 100 via the communication unit 208 without the main body device 120.

The image pick-up unit 210 is configured to capture images or moving images in a real space. Including the image pick-up unit 210 makes it possible for images or the moving images taken in advance by the user to be output to a display being operated by the user or a display of the game being played.

The GPS unit is configured to provide position information of the controller 100 acquired by the GPS unit to the display being operated by the user. For example, when the controller 100 is located in Hokkaido, a character of the display object to be operated by the user in the virtual space displayed on the HMD 140 can be set to a Hokkaido-specific character, or the user operation screen of the virtual space displayed on the HMD 140 can have a background of Hokkaido.

Figure 3:
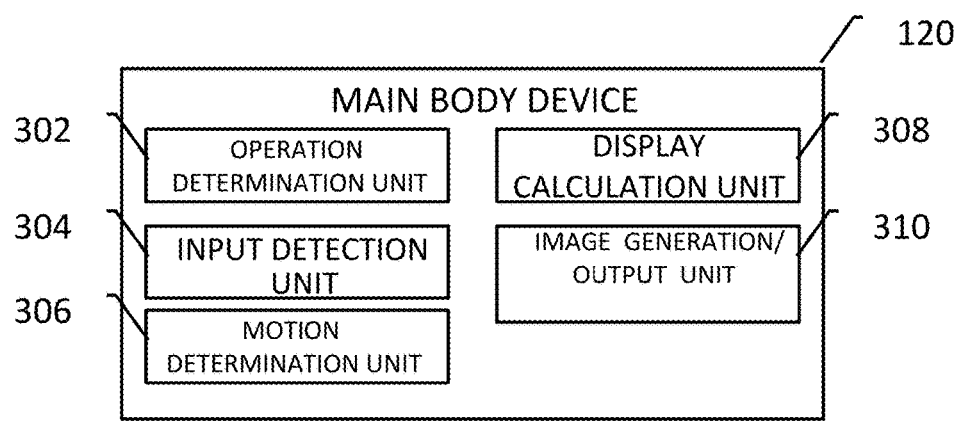
FIG. 3 is a block diagram of a main body device, in accordance with some embodiments.

FIG. 3 is a block diagram of the main body device 120, in accordance with some embodiments. The main body device 120 includes an operation determination unit 302, an input detection unit 304, a motion determination unit 306, a display calculation unit 308, and an image generation/output unit 310. The operation determination unit 302, input detection unit 304, motion determination unit 306, display calculation unit 308, image generation/output unit 310, or a part of any function thereof, is achieved by executing, by the processor 122, a predetermined program stored in the memory of the main body device 120.

The operation determination unit 302 is configured to first determine, based on the content of the application being executed in the main body device 120, what user operation input is required by the application. The required user operation is determined based on, for example, the content of the application being executed and a situation of the current user operation in the application being executed, and refers to a user operation with respect to the controller 100, which is allowed by the application being executed to be input. For example, when the user plays a battle game in a virtual space, examples of the required user operation that corresponds to an operation state during battle with enemies include "punching", "shooting", and "fending off an attack".

The input detection unit 304 is configured to acquire, via the network 180, output data corresponding to the required user operation among the pieces of output data stored in the memory of the controller 100. For example, when the required user operation is "punching," the output data corresponding to the required user operation is operation input information (contact to the display by the tap operation). In some embodiments, output data can include the number of times of contact within a predetermined time period. The input detection unit 304 is configured to output the detected output data to the motion determination unit 306. In some embodiments, if the required user operation is "punching" in the application being executed, the input detection unit 304 detects and acquires only the contact to the display, which corresponds to the tap operation, among the pieces of operation input information of the output data. The motion determination unit 306 can ignore the output data not corresponding to the required user operation, e.g., a voice input when the required user operation is "punching."

The input detection unit 304 is configured to detect, as the output data from the controller 100, data corresponding to the required user operation determined by the operation determination unit 302, among various types of information transmitted from the transmission unit 204 of the controller 100 via the network 180, e.g., the user's motion input information (acceleration and angular velocity obtained from the accelerometer and the gyroscope), the operation input information (types such as swipe operation and pinch-in/pinch-out operation, and/or contact to the sensor display, displacement amount of continuous contact to the display, contact displacement direction, and contact displacement speed), voice input information (voice and volume obtained from the microphone sensor), the images, the moving images, and the position information, or combinations thereof.

In some embodiments, the input detection unit 304 is configured to detect the output data during a predetermined time period at a predetermined timing. In some embodiments, the input detection unit 304 is configured to change the intervals of the timing to receive the output data. For example, if the display object is caused to perform rough operations, e.g., turning a knob of a door in a virtual space, the intervals of the timing for detection can be increased to detect the input 15 times per second. If, in the virtual space, the display object is caused to perform motions that require sequentially reflecting, to the screen, fine motions of a steering wheel, e.g., driving an automobile, the intervals of the timing for detection can be decreased to detect the input 60 times per second.

Table 1 includes example relationships among a content of an application being executed, a required user operation corresponding to the content of the application being executed, and output data corresponding to the required user operation. The content of the application, the required user operation, and the output data shown in Table 1 are merely examples, and a person skilled in the art may easily understand that other user operation states and other user operations may be included.

TABLE 1

| Content of application being executed | Required user operation | Output data corresponding to required user operation |
|---|---|---|
| Battle | Shooting/punching | Operation input information (contact to display by tap operation) |
| | Fending off | Motion input information (acceleration, angular velocity) |
| | Sliding | Operation input information (contact to display by tap operation) |
| | Swinging around | Motion input information (acceleration, angular velocity) |
| Fishing | Casting/tugging | Motion input information (acceleration, angular velocity) |
| Darts | Throwing | Motion input information (acceleration, angular velocity) |
| Image viewing | Scrolling | Operation input information (direction of swipe operation, displacement amount, displacement speed), and images/moving images |
| | Zooming-in/zooming-out | Operation input information (direction of pinch operation, displacement |

TABLE 1-continued

| Content of application being executed | Required user operation | Output data corresponding to required user operation |
|---|---|---|
| | | amount, displacement speed), and images/moving images |
| Voice/image conversion | Speaking out loud | Voice input information (voice, volume) |
| Driving | Operating steering wheel | Motion input information (acceleration, angular velocity) |
| | Accelerating | Button/key input information |
| | Stopping | Button/key input information |
| Tearing apart/ bringing together | Tearing apart/ bringing together | Operation input information (direction of pinch/swipe operation, displacement amount, displacement speed) |
| Zooming-in/ zooming-out | Zooming-in/ zooming-out | Operation input information (direction of pinch operation, displacement amount, displacement speed) |
| Map viewing, landscape rendering, character rendering | | Position data information |

Next, the motion determination unit 306 determines the motion to be performed by the display object displayed on the HMD 140, based on the output data detected by the input detection unit 304 in accordance with the required user operation. For example, if the required user operation is "punching," the motion to be performed by the display object in the virtual space (punching, frequency of punching) is determined depending on the sense of contact to the display and the number of times of contact, which are included in the output data. The display object refers to an object to be operated by the user in a virtual space, and examples of the display object include, when the user is playing a game, game characters and game items, and when the user displays taken images or moving images, those images and moving images.

In some embodiments, if the required user operation is "scrolling an image," the motion determination unit 306 is configured to acquire, among the pieces of operation input information of the output data, the direction of the swipe operation, the displacement amount, and the displacement speed. Then, the motion determination unit 306 is configured to determine the motion to be performed by the display object (scrolling an image) based on the direction of the swipe operation to the display, the displacement amount, and the displacement speed.

In some embodiments, if the required user operation is "bringing together two display objects," the motion determination unit 306 is configured to acquire, among the pieces of operation input information of the output data, the direction of the pinch-in operation (or swipe operation) to the display, the displacement amount, and the displacement speed. Then, the motion determination unit 306 is configured to determine the motion to be performed by the display object (coupling the two display objects into one) based on the direction of the pinch-in operation to the display, the displacement amount, and the displacement speed. In some embodiments, the motion determination unit 306 is configured to determine the direction to move the display object and the speed of the movement depending on the direction of the pinch-in operation performed by the user to the display, the displacement amount, and the displacement speed.

In some embodiments, if the required user operation is "operating a steering wheel," the motion determination unit 306 is configured to acquire, among the pieces of motion input information of the output data, the acceleration and the angular velocity. "Operating a steering wheel" requires fine operations, and hence the motion determination unit can increase the number of times to acquire the acceleration and the angular velocity within a fixed time period. Then, the motion determination unit 306 is configured to determine the motion to be performed by the display object (changing the direction of the display object) based on the acceleration and the angular velocity.

In some embodiments, if the required user operation is "swinging around", the motion determination unit 306 is configured to acquire, among the pieces of motion input information of the output data, the acceleration and the angular velocity. If a rough detection is sufficient for the operation of "swinging around," the motion determination unit 306 is configured to decrease the number of times to acquire the acceleration and the angular velocity within a fixed time period. Then, the motion determination unit 306 is configured to determine the motion to be performed by the display object (moving or swinging around the display object) based on the acceleration and the angular velocity. In some embodiments, the motion determination unit 306 is configured to determine the strength and direction to swing around the display object based on the acceleration and the angular velocity.

In some embodiments, if the required user operation is "throwing," the motion determination unit 306 is configured to acquire, among the pieces of motion input information of the output data, the acceleration and the angular velocity. Then, the motion determination unit 306 is configured to determine the motion to be performed by the display object (throwing the display object) based on the acceleration and the angular velocity. In some embodiments, the motion determination unit 306 is configured to determine the strength and direction to throw the display object based on the acceleration and the angular velocity.

In some embodiments, the required user operation is "speaking out loud," the motion determination unit 306 is configured to acquire voice input information among the pieces of output data. Then, the motion determination unit 306 is configured to determine the motion to be performed by the display object (enlarging the display object) depending on the volume. In some embodiments, the motion determination unit 306 is configured to determine the size to enlarge the display object to based on the volume.

The display calculation unit 308 is configured to perform a display calculation of the display object based on the motion determined by the motion determination unit 306 and the operation data for the display object associated with the motion, to generate an image of the display object. The operation data includes acceleration, an angular velocity, a displacement amount, a displacement speed, and a direction when the display object is moved. When a so-called three-dimensional image is generated, display parameters including data of respective apexes of the display object (position coordinates of the apexes in the world coordinate system, color data) are calculated, and the images of the display object are sequentially generated for the respective frames based on the calculated display parameters.

The image generation/output unit 310 is configured to generate, for each frame, an image in which the calculated display object is placed on a screen displayed on the display of the activated head-mounted device, and outputs the image to the screen. The HMD 140 is configured to display the image output from the image generation/output unit 310.

Figure 4:
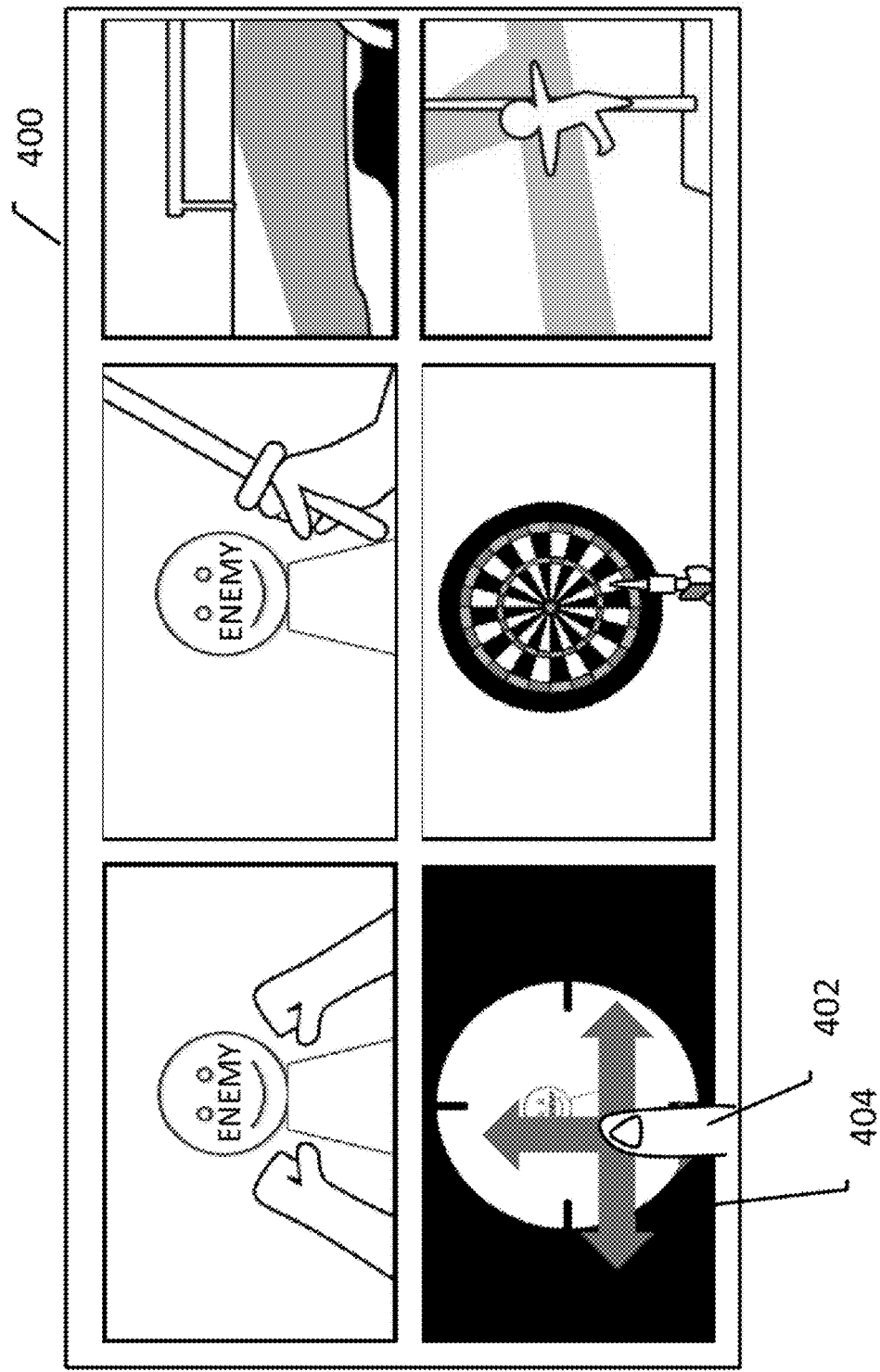
FIG. 4 is a user interface generated based on a swipe operation performed by a user, in accordance with some embodiments.

FIG. 4 is an example of a screen 400 to be displayed on the HMD 140 in accordance with some embodiments.

Screen 400 is generated based on the swipe operation performed by the user. When the output data acquired by the input detection unit is a swipe operation, the display object being an object to be operated (six images in FIG. 4) is scrolled in the swiped direction. As illustrated in FIG. 4, indications (402, 404) corresponding to the sensor display operated by the user are virtually displayed on the HMD 140. In this manner, even when the user wearing the HMD 140 is completely immersed in the virtual space, the user can reliably recognize the operation performed or intended to be performed by the user.

Figure 5A:
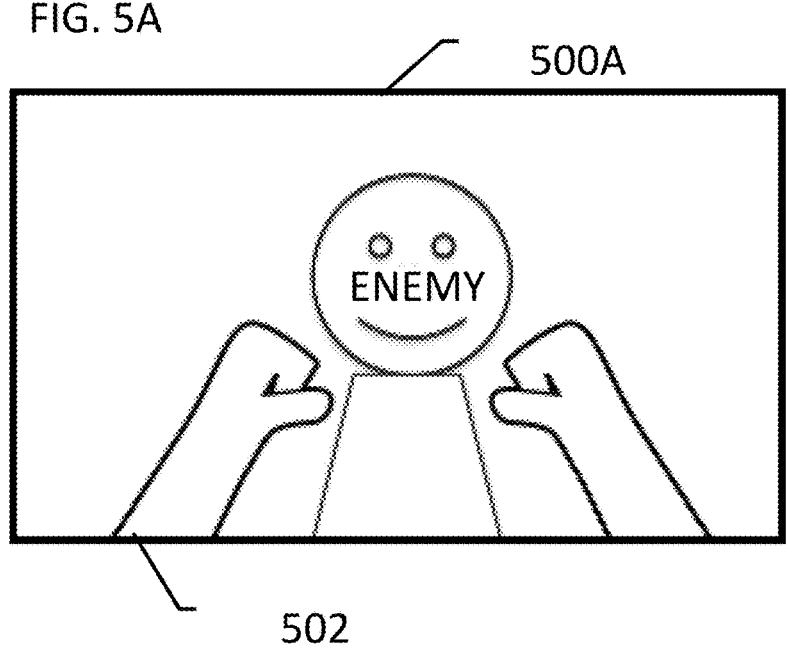
FIG. 5A is a user interface generated based on a tap operation performed by the user, in accordance with some embodiments.
Figure 5B:
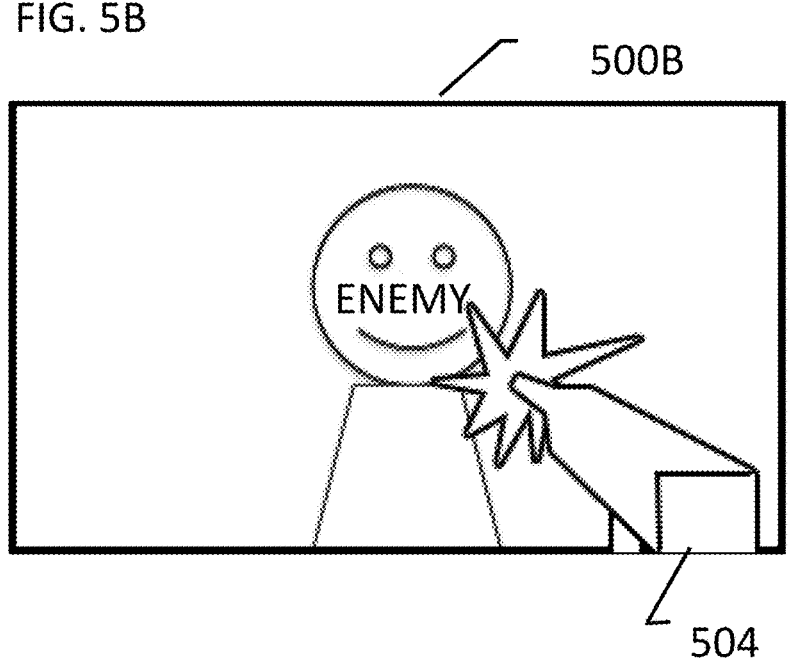
FIG. 5B is a user interface generated based on a tap operation performed by the user, in accordance with some embodiments.

FIG. 5A and FIG. 5B are examples of a screen (500A, 500B) to be displayed on the HMD 140 in accordance with some embodiments. Screens 500A and 500B are generated based on the tap operation performed by the user. When the output data received from the input detection unit 304 corresponds to the tap operation, the display object being the object to be operated (a hand 502 in FIG. 5A, and a gun 504 in FIG. 5B) performs a motion of punching/shooting. For example, every time the user taps the sensor display 108 of the controller 100, the display object performs the motion of punching/shooting. Further, when the output data includes the number of times of tapping within a fixed time period, the speed for the object to perform the motion of punching/shooting can be changed based on the number of times of tapping.

Figure 6:
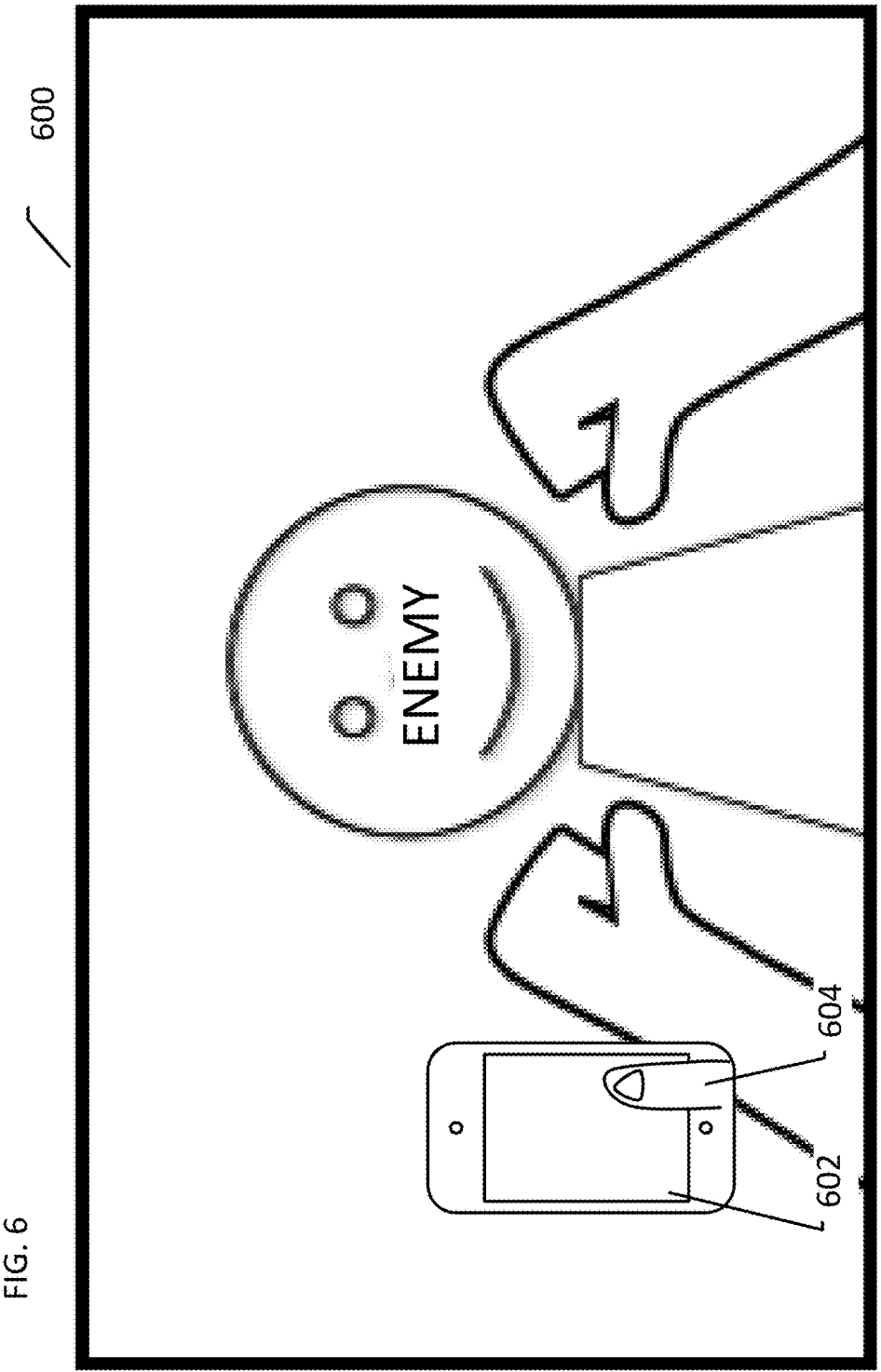
FIG. 6 is a user interface generated based on a tap operation performed by the user, in accordance with some embodiments.

FIG. 6 is an example of a screen 600 to be displayed on the HMD 140 in accordance with some embodiments. Screen 600 is generated based on the tap operation performed by the user. The display screen 600 of FIG. 6 includes a sensor display 602 virtually displayed on the virtual space. The virtually-displayed sensor display 602 can virtually display a finger 604 (operation finger) of the user. The user immersed in the virtual space is wearing the HMD 140, and is disconnected from information of the external world. Therefore, the user cannot recognize the controller 100 present in the real space in detail. By virtually displaying the sensor display of the controller 100 present in the real space on the virtual space, the user can recognize various operations to be performed to the controller without taking off the HMD 140.

Figure 7A:
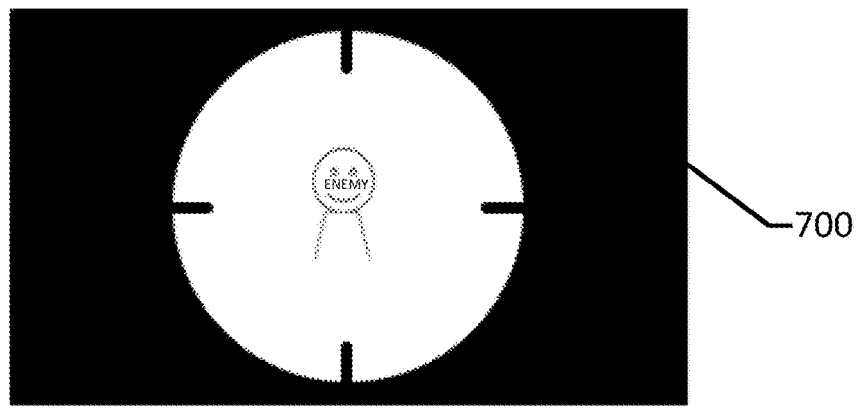
FIG. 7A is a screen to be displayed on the HMD, which is generated based on a pinch-in/pinch-out operation performed by the user, in accordance with some embodiments.
Figure 7B:
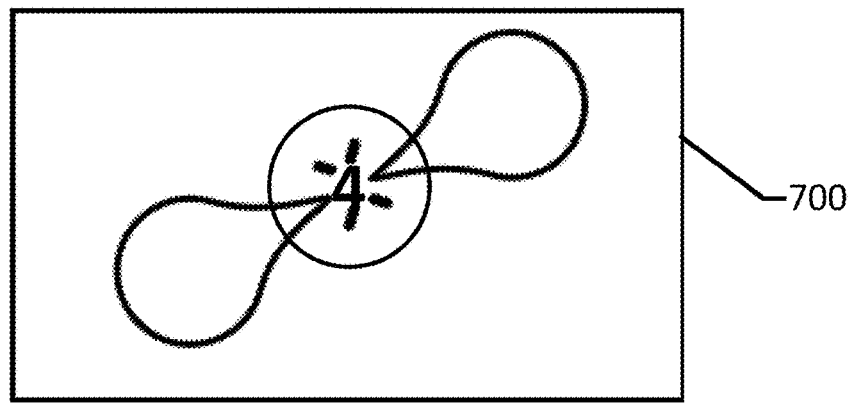
FIG. 7B is a user interface generated based on a pinch-in/pinch-out operation performed by the user, in accordance with some embodiments.
Figure 7C:
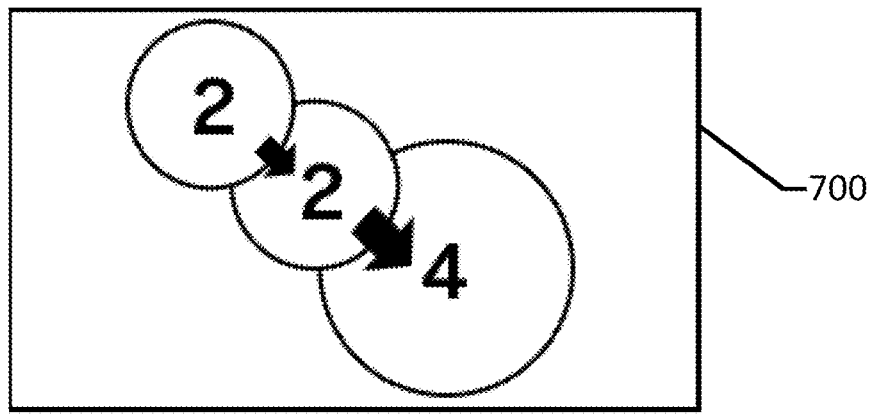
FIG. 7C is a user interface generated based on a pinch-in/pinch-out operation performed by the user, in accordance with some embodiments.

FIG. 7A, FIG. 7B, and FIG. 7C are examples of screen 700 to be displayed on the HMD 140 in accordance with some embodiments. Screen 700 is generated based on the pinch-in/pinch-out operation performed by the user. When the output data received from the input detection unit 304 corresponds to a pinch-out operation, the display object being the object to be operated (image inside the black circle in FIG. 7A) is subjected to a zoom-in motion of the display object associated with the operation input. Further, when the output data received from the input detection unit includes the displacement amount of the operation, the screen operation amount of the zoom-in motion can be determined based on the displacement amount. Further, when the type of the output data received from the input detection unit is a pinch-out operation, and the pinch-out operation is performed on the display object being the object to be operated selected by the user (in FIG. 7B, the center circle with the number 4), the display object is separated into two objects (in FIG. 7B, water droplets) (the object is torn into two pieces). The separation of the object can be also achieved by a swipe operation. When the output data received from the input detection unit is a pinch-in operation, the display objects being the objects to be operated (in FIG. 7C, two circles with the number 2) can be coupled, to thereby obtain one large circle with the number 4 (two objects are brought together).

Figure 8A:
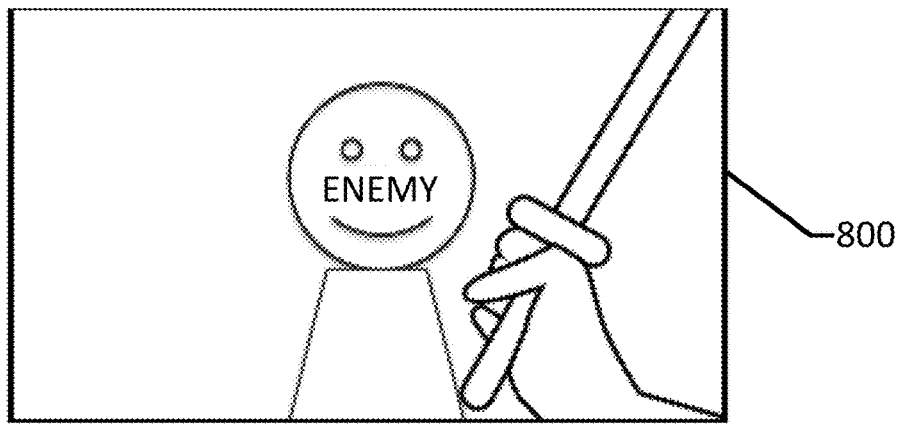
FIG. 8A is a user interface generated based on motion input obtained from an accelerometer or a gyroscope, in accordance with some embodiments.
Figure 8B:
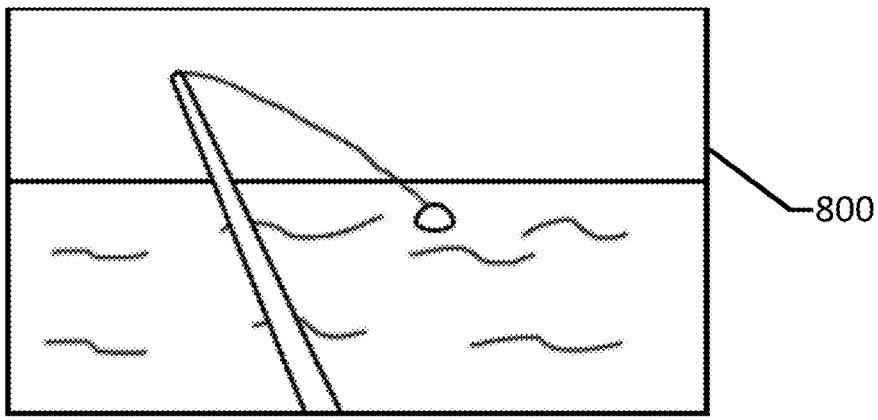
FIG. 8B is a user interface generated based on motion input obtained from the accelerometer or the gyroscope, in accordance with some embodiments.
Figure 8C:
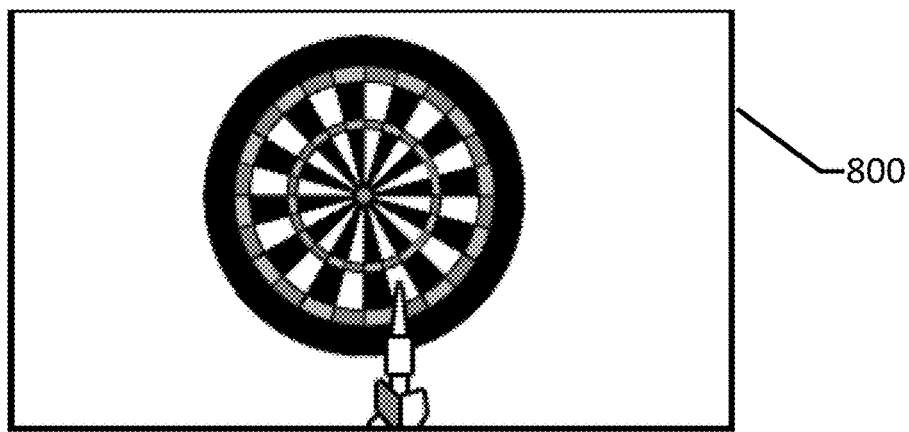
FIG. 8C is a user interface generated based on voice input obtained from the accelerometer or the gyroscope, in accordance with some embodiments.

FIG. 8A, FIG. 8B, and FIG. 8C are examples of a screen 800 to be displayed on the HMD 140, in accordance with some embodiments. When the output data received from the input detection unit 304 corresponds to the user's motion input information obtained from the accelerometer or the gyroscope, the display object being the object to be operated (a sword in FIG. 8A, a fishing rod in FIG. 8B, and a dart in FIG. 8C) is subjected to a motion of swinging around the sword in FIG. 8A, a motion of casting the fishing rod in FIG. 8B, or a motion of throwing the dart in FIG. 8C. Further, the display object can be moved at a predetermined speed or acceleration, or the display object can be swung, casted, or thrown at a predetermined force based on the acceleration included in the output data received from the input detection unit. When the output data received from the input detection unit includes the angular velocity, the motion determination unit can further move the display object in a predetermined direction.

Figure 9A:
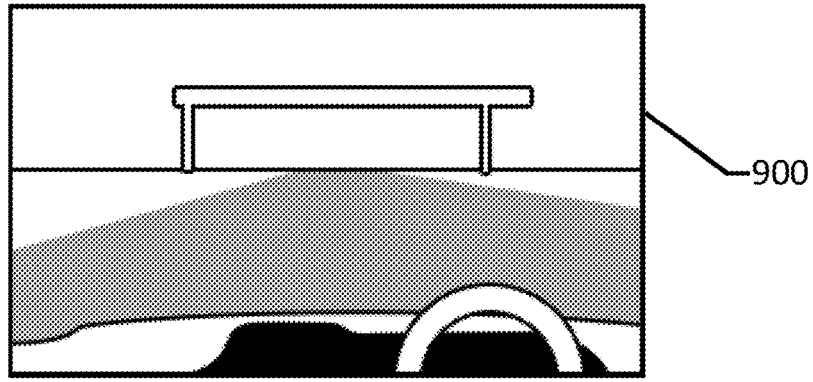
FIG. 9A is a user interface generated based on motion input obtained from the accelerometer or the gyroscope, in accordance with some embodiments.
Figure 9B:
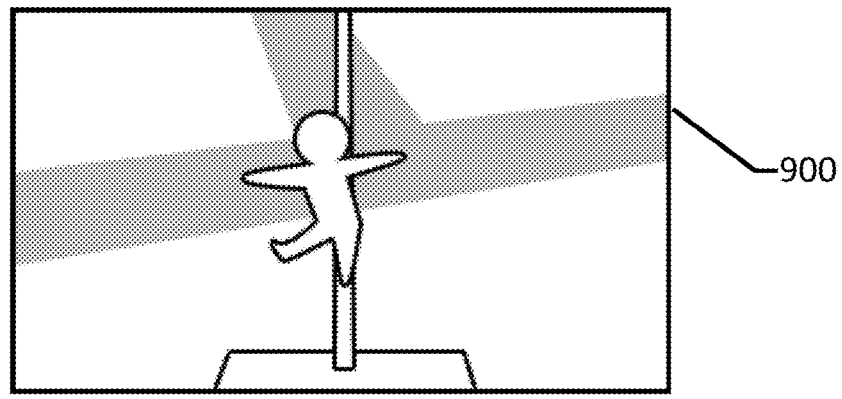
FIG. 9B is a user interface generated based on motion input obtained from the accelerometer or the gyroscope, in accordance with some embodiments.
Figure 9C:
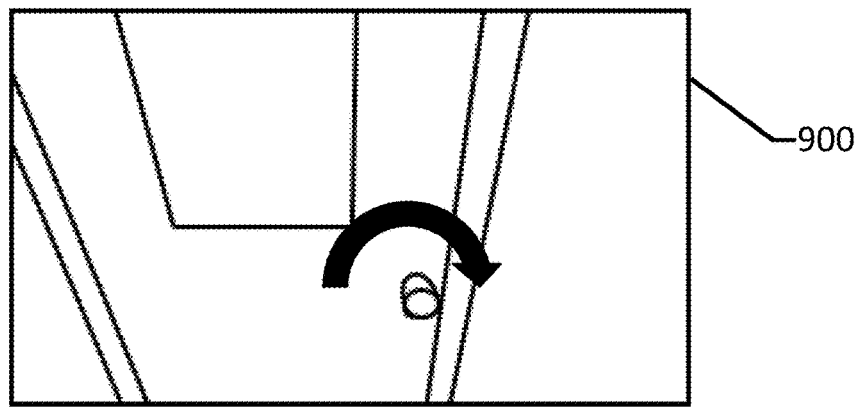
FIG. 9C is a user interface generated based on motion input obtained from the accelerometer or the gyroscope, in accordance with some embodiments.

FIG. 9A, FIG. 9B, and FIG. 9C are examples of a screen 900 to be displayed on the HMD 140 based on the input from the accelerometer or the gyroscope, in accordance with some embodiments. When the output data received from the input detection unit 304 corresponds to the user's motion input information obtained from the accelerometer or the gyroscope, the display object being the object to be operated (the entire race screen background in FIG. 9A, a person or the whole screen in FIG. 9B, and a door knob in FIG. 9C) is subjected to a motion of rotating the display object associated with the motion input information. Further, the display object can be rotated at a predetermined angular velocity based on the angular velocity included in the output data received from the input detection unit.

Figure 10A:
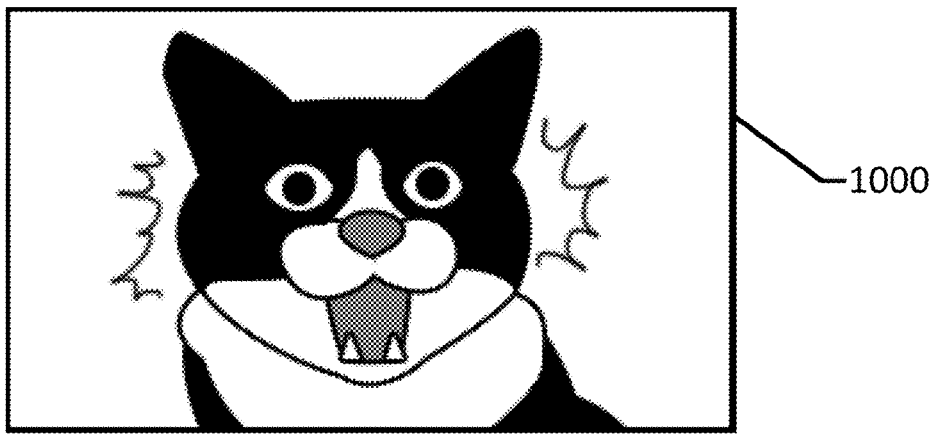
FIG. 10A is a user interface generated based on voice input obtained from a microphone sensor, in accordance with some embodiments.
Figure 10B:
FIG. 10B is a user interface generated based on an input obtained from the microphone sensor, in accordance with some embodiments.

FIG. 10A and FIG. 10B are examples of a screen 1000 to be displayed on the HMD 140 based on the input from the microphone sensor in accordance with some embodiments. When the type of the output data received from the input detection unit is a user's voice input obtained from the microphone, the display object associated with the voice input (a cat in FIG. 10A, and letters of "Ahhhh!!" in FIG. 10B) is subjected to a predetermined motion (motion of obtaining a surprised look of the cat in FIG. 10A, and motion of enlarging the letters of "Ahhhh!!" in FIG. 10B). Further, the size and the speed of the display object to be displayed in an enlarged manner can be changed based on the volume and the direction obtained from the microphone sensor.

Figure 11:
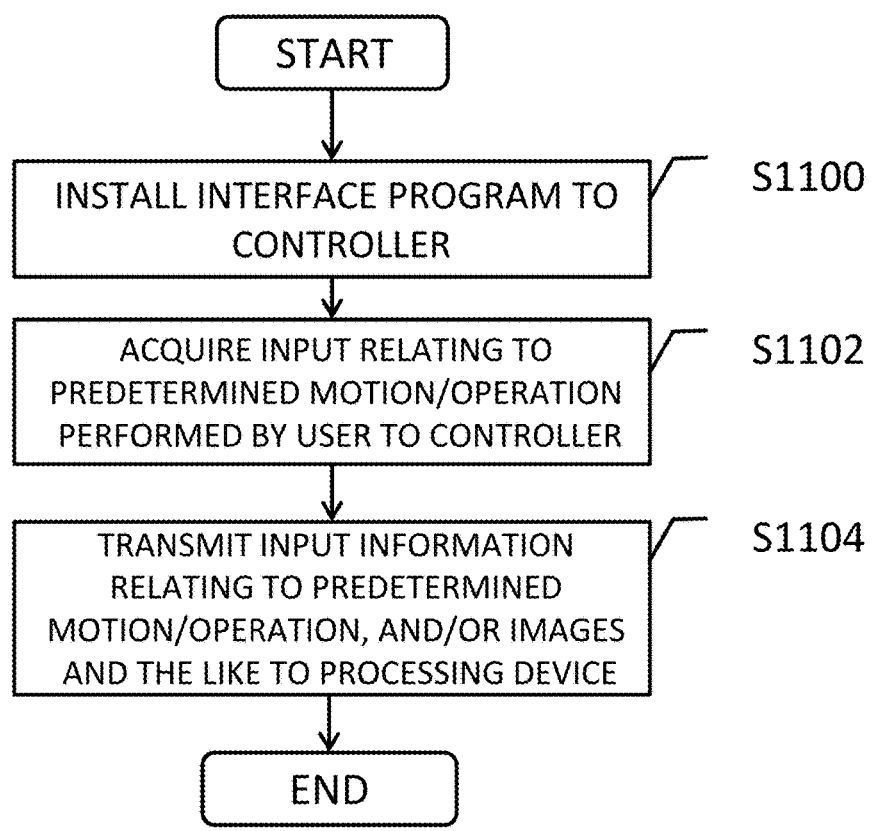
FIG. 11 is a flow chart of a process to be performed by the controller, in accordance with some embodiments.

FIG. 11 is a flow chart of a process to be performed by the controller 100 in accordance with some embodiments.

In step S1100, the interface program 106A is downloaded and installed to the controller 100 by the antenna of the controller 100 via the Internet. By installing the interface program 106A to the controller 100, even when the controller 100 is not a controller dedicated to the main body device 120.

In step S1102, the operation unit 202 acquires the input information relating to the predetermined motion/operation performed by the user to the controller 100, and stores the information to the memory.

In step S1104, the transmission unit 204 transmits, to the main body device 120, as the output data, various types of input relating to the predetermined motion, various types of input information relating to the predetermined operation, and/or images or moving images stored in the memory of the controller 100, and the position information, or combinations thereof. In response to the request from the input detection unit 304 of the main body device 120, a transmission unit 204 can transmit, among the pieces of output data, the output data corresponding to the required user operation based on the content of the application being executed.

Figure 12:
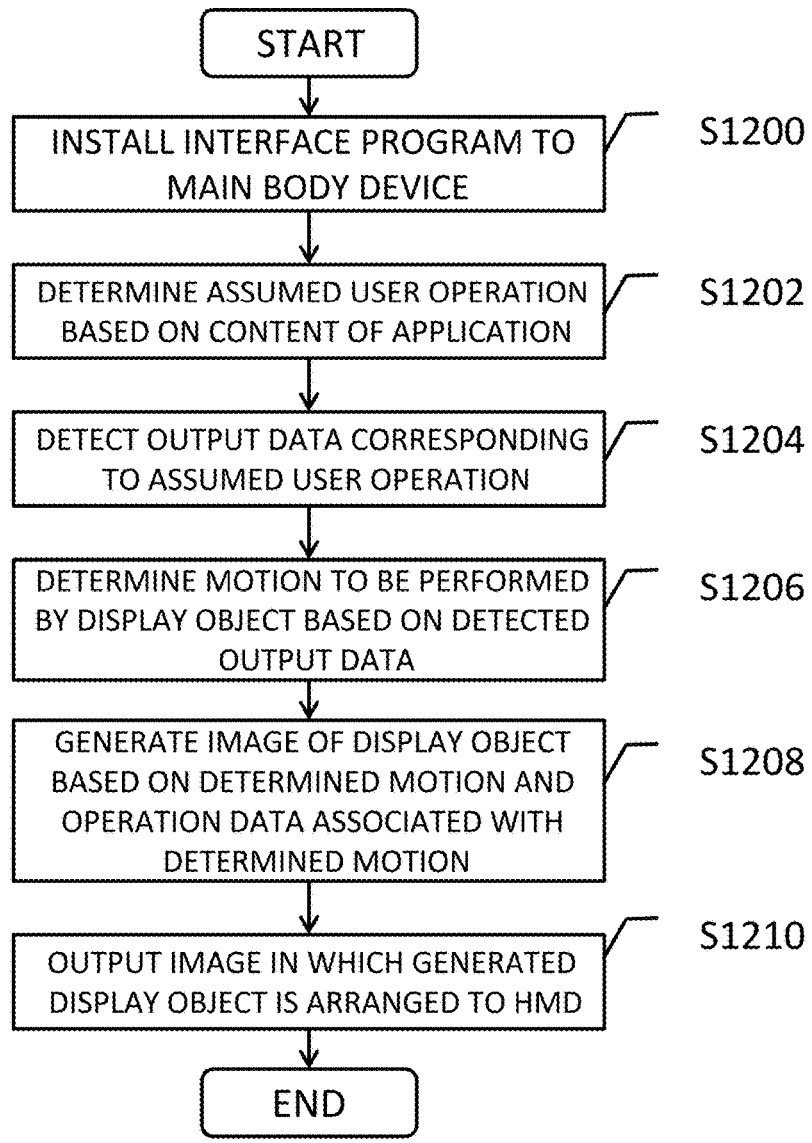
FIG. 12 is a flow chart of a process to be performed by the main body device, in accordance with some embodiments.

FIG. 12 is a flow chart of a process to be performed by the main body device 120, in accordance with some embodiments.

In step S1200, the main body device-side interface program 126A is installed in the main body device 120. The main body device 120 may connect to the external network to acquire the interface program 126A, or may use a storage media to acquire the interface program 126A.

In step S1202, the operation determination unit 302 determines the required user operation that the application allows the user performing operation to input, based on the content of the application being executed or the like in the main body device 120.

In step S1204, the input detection unit 304 receives and detects, among the pieces of output data transmitted from the transmission unit 204 of the controller 100, the output data corresponding to the user operation required by the application being executed, from the transmission unit 204 of the controller 100 via the network 180.

In step 1206, the motion determination unit 306 determines the motion to be performed by the display object in the virtual space of the application being executed, depending on the output data corresponding to the required user operation.

In step S1208, the display calculation unit 308 performs a display calculation of the display object based on the motion determined by the motion determination unit 306 and the operation data for the display object associated with the motion, to thereby generate the image of the display object.

In step S1210, the image generation/output unit 310 generates, for each frame, an image in which the generated display object is placed on the screen displayed on the display of the activated HMD 140, to thereby output the image to the HMD 140.

Figure 13:
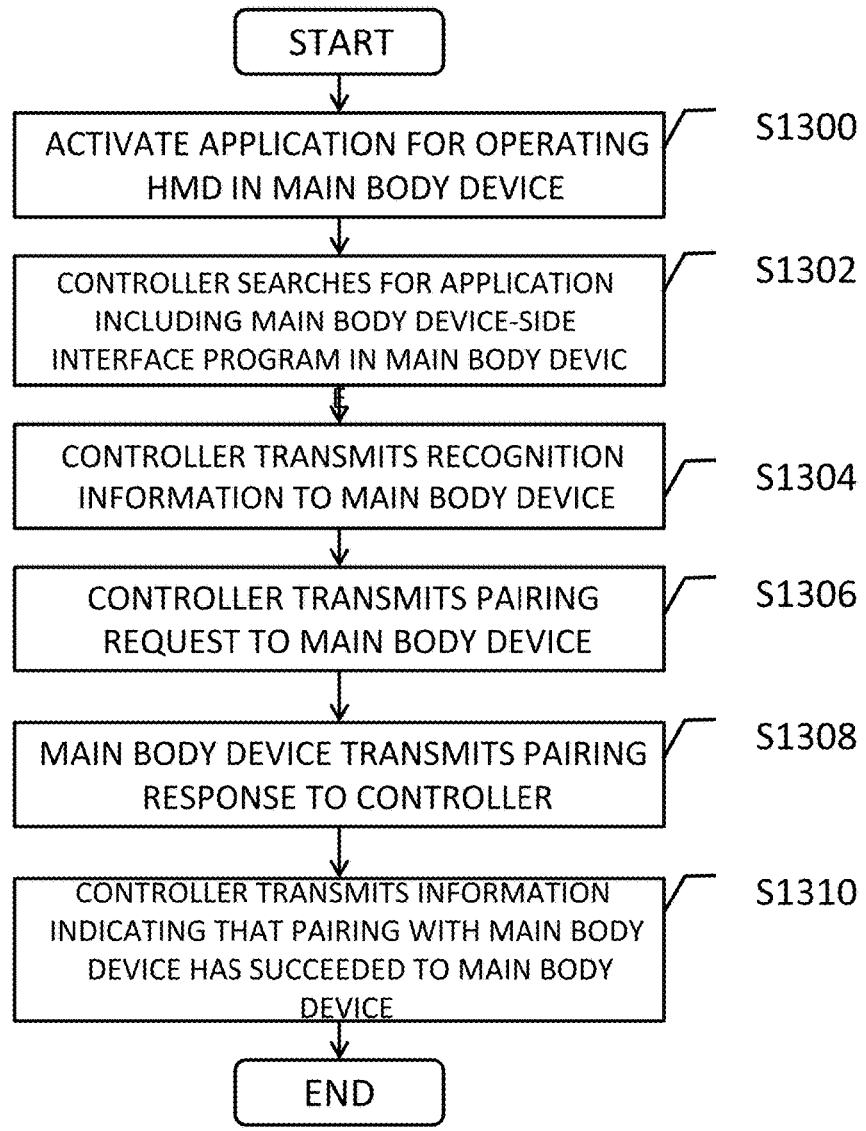
FIG. 13 is a flow chart of a process of connecting the controller and the main body device, in accordance with some embodiments.

FIG. 13 is a flow chart of a process of connecting the controller 100 and the main body device 120 to each other on an application, in accordance with some embodiments. The controller 100 and the main body device 120 are connected to each other via the network 180 in a manner that communication is enabled therebetween.

In step S1300, the main body device 120 activates an application for connecting to the HMD 140 and operating the HMD 140.

In step S1302, the controller 100 executes the interface program 106A such that the controller 100 searches for an application including the interface program 126A stored in the main body device 120.

In step S1304, when the application including the interface program 126A is found in the main body device 120, the controller 100 transmits the recognition information of the search to the interface program 126A of the main body device 100.

In step S1306, the controller 100 displays the recognized application including the interface program 126A on the display 108. Then, when the user taps the displayed recognized application, the controller 100 transmits a pairing request to the main body device-side interface program 126A.

In step S1308, the main body device-side interface program 126A transmits, to the interface program 106A of the controller 100, a pairing response in response to the pairing request transmitted from the controller 100.

In step S1310, the interface program 106A of the controller 100 transmits, to the main body device-side interface program 126A, information indicating that pairing between the controller 100 and the main body device 120 has succeeded. With this, the connection between the controller 100 and the main body device 120 on the application is completed.

FIG. 14 is a block diagram of a system comprising of a plurality of controllers, in accordance with some embodiments. In FIG. 14, the plurality of controllers 100 are connected to each other not via the main body device 120 but via the Internet. A first controller 100A and a second controller 100B can each include a processor, a memory, an interface, and a sensor display as discussed with respect to controller 100 shown in FIG. 1. In some embodiments, the first controller 100A and the second controller 100B each include the functional configuration illustrated in FIG. 2, or a part of the functional configuration illustrated in FIG. 2. In some embodiments, the plurality of controllers comprises three or more controllers.

In FIG. 14, only one controller 100A is connected to one main body device 120, and the other controllers 100B are connected to the server 160 via the Internet. With this configuration, without increasing the load on the one main body device 120, various operations can be performed on the one operation screen by a plurality of users without imposing a high load on system resources. Further, the plurality of users are not required to be located in the same space, and can be located in different spaces.

FIG. 15 is a diagram of a user interface in which one operation screen is operated by a plurality of users, in accordance with some embodiments. In FIG. 15, a user A is wearing the HMD 140, but a user B is not wearing an HMD. The user B not wearing the HMD can also view the operation screen of the user A via the display of the second controller 100B, or can perform, with respect to the screen being operated by the user A, an operation input of swiping, tapping, or pinching with use of the sensor display of the second controller 100B, or motion input with use of the accelerometer and the angular velocity sensor of the second controller 100B. For example, as illustrated in FIG. 15, while the user A is playing a racing game, another user B can use the sensor display of the second controller 100B of the user B to place an obstacle (banana in FIG. 15) in the screen being operated by the user A.

An aspect of this description is related to a system comprising a first device configured to cause a virtual reality image to be output by a display. The system also comprises a second device communicatively coupled with the first device. The second device is configured to detect a user input associated with an action capable of being displayed in the virtual reality image. The second device is also configured to cause the first device to cause an object to be displayed in the virtual reality image based on the user input. The object at least partially comprises a graphic representative of one or more of the second device, a user movement with respect to the second device, or the user input.

Another aspect of this description is related to a method comprising causing, by a first device, a virtual reality image to be output by a display. The method also comprises detecting, by a second device communicatively coupled with the first device, a user input associated with an action capable of being displayed in the virtual reality image. The method further comprises causing, by the second device, the first device to cause an object to be displayed in the virtual reality image based on the user input. The object at least partially comprises a graphic representative of one or more of the second device, a user movement with respect to the second device, or the user input.

A further aspect of this description is related to an apparatus comprising at least one processor, and at least one memory connected to the at least one processor and including computer program code for one or more programs. The at least one memory and the computer program code are configured to, with the at least one processor, cause the apparatus to cause a virtual reality image to be output by a display based on received data indicative of a user input associated with an action capable of being displayed in the virtual reality image. The apparatus is also caused to cause an object to be displayed in the virtual reality image based on the data indicative of the user input. The object at least partially comprises a graphic representative of one or more of the second device, a user movement with respect to the second device, or the user input.

The above-mentioned embodiments are merely an example for facilitating an understanding of the present disclosure, and does not serve to limit an interpretation of the present disclosure. It is to be understood that the present disclosure can be changed and modified without departing from the gist of the disclosure, and that the present disclosure includes equivalents thereof.

What is claimed is:

1. A system, comprising:
a first device configured to cause a virtual reality image to be output by a display viewable by a user; and
a second device communicatively coupled with the first device, the second device being configured to:
detect a user input from the user, wherein the user input is associated with an action capable of being displayed in the virtual reality image; and
instruct the first device to cause an object to be displayed in the virtual reality image based on the user input,
wherein the object at least partially comprises a graphic representative of one or more of the second device, a user movement with respect to the second device, or the user input,
the user input is a first user input, the action is a first action, the object is a first object, and the system further comprises:
a third device communicatively coupled with the second device by way of a communication network independent of the first device, the third device being configured to:
detect a second user input associated with a second action capable of being displayed in the virtual reality image; and
cause the first device, by way of the second device, to cause a second object to be displayed in the virtual reality image based on the second user input,
wherein the second object comprises an image associated with the second action or at least partially comprises a graphic representative of one or more of the third device, a user movement with respect to the third device, or the second user input.

2. The system according to claim 1, wherein the first device is communicatively coupled with the display.

3. The system according to claim 2, wherein the display is a head mounted display.

4. The system according to claim 1, wherein the second device is configured to have connectivity to a communication network independent of the first device.

5. The system according to claim 1, wherein at least one of the first device or the second device is a mobile device.

6. The system according to claim 5, wherein the user input comprises one or more of a swipe operation, a tap operation, and a pinch-in/pinch-out operation.

7. The system according to claim 6, wherein at least one of the first device or the second device comprises the display, and the second device is configured to detect the user input based on a contact with the display.

8. The system according to claim 1, wherein the user input is based on a voice input performed by the user, and the object comprise one or more of an image corresponding to the voice input or a textual representation of the voice input.

9. The system according to claim 8, wherein second device is further configured to cause the object displayed by the virtual space to change based on the voice input.

10. The system according to claim 1, wherein the user input is based on a motion input performed by the user, and the second device comprises one or more of an accelerometer, a gyroscope or a GPS unit configured to output data upon which the motion input is based.

11. The system according to claim 1, wherein the graphic comprises at least a finger of a user positioned in the virtual reality image with respect to an image of the second device.

12. The system according to claim 1, wherein the second device is configured to cause the object to move in the virtual reality image based on the user input.

13. The system according to claim 1, wherein the display is a first display, and the third device is further configured to cause a second display to output the virtual reality image, and at least one of the first object or the second object.

14. The system according to claim 13, wherein the third device comprises the second display.

15. A system, comprising:
a first device configured to cause a virtual reality image to be output by a display viewable by a user; and
a second device communicatively coupled with the first device, the second device being configured to:
detect a user input from the user, wherein the user input is associated with an action capable of being displayed in the virtual reality image; and
instruct the first device to cause an object to be displayed in the virtual reality image based on the user input,
wherein the object at least partially comprises a graphic representative of one or more of the second device, a user movement with respect to the second device, or the user input,
the display is a first display, and the system further comprises: a third device communicatively coupled with the second device by way of a communication network independent of the first device, the third device being configured to cause a second display to output the virtual reality image.

16. The system according to claim 15, wherein the third device is further configured to cause the second display to output the object in the virtual reality image output by the second display.

17. A system, comprising:
a first device configured to cause a virtual reality image to be output by a display viewable by a user; and
a second device communicatively coupled with the first device, the second device being configured to:
detect a user input from the user, wherein the user input is associated with an action capable of being displayed in the virtual reality image; and
instruct the first device to cause an object to be displayed in the virtual reality image based on the user input,
wherein the object at least partially comprises a graphic representative of one or more of the second device, a user movement with respect to the second device, or the user input,
the system further comprising:

a server; and a third device communicatively coupled with the server by way of a communication network independent of the first device, wherein the second device is communicatively coupled with the server by way of the communication network independent of the first device, the display is a first display, and the third device is configured to cause a second display to output the virtual reality image based on data received from the server.

18. A method, comprising:

causing, by a first device, a virtual reality image to be output by a display viewable by a user;

detecting, by a second device communicatively coupled with the first device, a first user input from the user, wherein the first user input is associated with a first action capable of being displayed in the virtual reality image;

controlling, by the second device, the first device to cause a first object to be displayed in the virtual reality image based on the user input;

detecting, by a third device, a second user input associated with a second action capable of being displayed in the virtual reality image; and causing, by the third device, the first device, by way of the second device, to cause a second object to be displayed in the virtual reality image based on the second user input, wherein the first object at least partially comprises a graphic representative of one or more of the second device, a user movement with respect to the second device, or the first user input, and the second object comprises an image associated with the second action or at least partially comprises a graphic representative of one or more of the third device, a user movement with respect to the third device, or the second user input.

* * * * *